United States Patent [19]
Long et al.

[11] Patent Number: 5,321,724
[45] Date of Patent: Jun. 14, 1994

[54] INTERFERENCE SUPPRESSION SYSTEM

[75] Inventors: Brian Long, Clontarf; Michael J. Hynes, Galway, both of Ireland

[73] Assignee: Digital Equipment Corporation, Maynard, Mass.

[21] Appl. No.: 965,525

[22] Filed: Oct. 23, 1992

Related U.S. Application Data

[63] Continuation of Ser. No. 671,069, Mar. 18, 1991, abandoned.

[30] Foreign Application Priority Data

Mar. 17, 1990 [GB] United Kingdom ................. 9006088

[51] Int. Cl.$^5$ ............................................. H04B 3/54
[52] U.S. Cl. ........................................ 375/36; 330/279
[58] Field of Search ............................. 375/36, 76, 98; 330/282, 279, 298; 328/54; 455/217; 307/340-342

[56] References Cited

U.S. PATENT DOCUMENTS

| | | | |
|---|---|---|---|
| 4,143,239 | 3/1979 | Hultman et al. | 375/36 |
| 4,573,168 | 2/1986 | Henze et al. | 375/36 |
| 4,639,936 | 1/1987 | Hogan et al. | 375/36 |
| 4,929,941 | 5/1990 | Lecocq | 375/36 |
| 4,943,739 | 7/1990 | Slaughter | 307/542 |
| 4,964,140 | 10/1990 | Yonerura | 455/217 |
| 4,994,690 | 2/1991 | Sandstrom et al. | 375/36 |
| 5,012,129 | 4/1991 | Basten | 375/36 |
| 5,050,187 | 9/1991 | Ichie | 375/36 |

FOREIGN PATENT DOCUMENTS

| | | |
|---|---|---|
| 2535722 | 6/1977 | Fed. Rep. of Germany . |
| 3744130 | 7/1989 | Fed. Rep. of Germany . |
| 567350 | 9/1975 | Switzerland . |
| 600704 | 6/1978 | Switzerland . |

Primary Examiner—Stephen Chin
Assistant Examiner—Young Tse
Attorney, Agent, or Firm—Denis G. Maloney; Albert P. Cefalo

[57] ABSTRACT

A line driver is coupled by a pair of signal lines to a receiver. Preprocessing circuitry, for processing signals arriving on the pair of signal lines at the receiver, includes regulating circuitry for regulating the voltage between the signal lines between predetetermined limits and thereby modifying the sensitivity of the system to compensate for changes in line conditions and reject interference when the line driver is powered down. The regulating means includes: bias circuitry, for putting a bias on the signal passing through to the receiver, so as to hold the receiver input away from the triggering voltage level so that it is not triggered by noise; and bias limiting circuitry, responsive to signals from the driver so as to limit or reduce the effective bias, so that the sensitivity of the system to true signals from the driver is not reduced below a desired level. A resistor is connected between the two signal lines. A current regulating circuit includes circuitry for feeding a current through the resistor; and, for each signal line, there is current adjustment circuitry, responsive to the conditions on the signal lines for adjusting the current passing through the corresponding end of the resistor.

22 Claims, 4 Drawing Sheets

INTERFERENCE SUPPRESSION SYSTEM

This application is a continuation of application Ser. No. 07/671,069, filed Mar. 18, 1991, now abandoned.

BACKGROUND OF THE INVENTION

The present invention relates to the suppression of interference on signal lines.

In the computer field, there are many situations in which signals have to be transmitted between different units of equipment. One common signalling technique uses DC signalling. This technique is commonly used where the distance between the two units of equipment is in the region of a meter up to around 1000 meters, and the bit rate is not excessively high.

This technique is largely free of interference if a single channel (of say 8 lines in parallel) is operated continuously. However, a problem can arise if the channel is not always in operation but the circuitry at the receiving end is left turned on. Interference can be generated on the channel, and this may be large enough to produce false triggering of the receiving circuitry.

Considering this in more detail, the receiving circuitry often has to be left turned on permanently, since it may not be known when the unit at the transmitting end will be in operation and it will not be feasible for the receiving circuitry to be turned on and off with the transmitting unit. A typical example is a microcomputer or workstation coupled to a host computer located elsewhere in a large building. The host computer has to keep its receiving circuitry permanently operating, while the various units to which it is coupled are powered up and powered down at unpredictable times.

The present signalling technique is effective at distances of up to around 1000 m. The signals are carried by a signal line which is referenced to a common return or ground line. The signal line is driven by a driver circuit, and the output impedance of such a driver circuit when powered own is typically high. The voltage on a signal line is therefore largely governed by the receiver circuit when the driver is powered down. However, variations in the local ground voltage between the two locations will be imposed on the return line at the driver end. Thus such local ground voltage fluctuations will appear between the signal and return lines at the receiver.

Also, it will often happen that the lines of two or more channels (between the same or different units) will run close to each other for substantial distances. There will then be substantial capacitive coupling between the lines of the different channels. Since the output impedance of a powered down driver is high, this can induce substantial voltages on the lines of a powered down channel. This cross-coupling will thus also appear at the receiver of a powered down channel.

There are various recognized standards for this type of transmission system. These specify, among other things, the sensitivity of the receivers. This sensitivity is such that interference (from either of these causes) can easily cause false triggering of the receivers of a powered down channel. This is clearly undesirable. Although the receiving unit can be designed to detect such false triggering, e.g. by detecting that it violates system protocols, this makes the system design more complicated, and incurs the overhead of processing these false signals (which are normally treated as attempts at logging into the system).

SUMMARY OF THE INVENTION

The main object of the present invention is to provide circuitry for preprocessing signals arriving on a pair of lines at a receiver so as to reject interference appearing when the driver is powered down.

In a preferred embodiment, the present invention provides an interference suppression system comprising a line driver and a receiver coupled by a pair of signal lines. The system also includes preprocessing circuitry for processing signals arriving on the pair of signal lines at the receiver. The preprocessing circuitry including regulating means for regulating the voltage between the signal lines between predetermined limits and thereby modifying the sensitivity of the system to compensate for changes in line conditions and reject interference when the line driver is powered down.

In a first embodiment, preferably in the preprocessing circuitry, the regulating means comprises bias means for putting a bias on the signal passing through to the receiver, so as to hold the receiver input away from the triggering voltage level so that it is not triggered by noise; and bias limiting means responsive to signals from the driver so as to limit or reduce the effective bias; so that the sensitivity of the system to true signals from the driver is not reduced below a desired level.

In a second embodiment, preferably the preprocessing circuitry comprises a resistor connected between the two signal lines; a current regulating circuit including means for feeding a current through the resistor; and, for each signal line, current adjustment means responsive to the conditions on the signal lines for adjusting the current passing through the corresponding end of the resistor.

The present preprocessing circuitry puts a bias on the signal passing through to the receiver. This bias has the effect of holding the receiver input away from the triggering voltage level, so that it is not triggered by noise, but the preprocessing circuitry is responsive to signals from the driver so as to limit or reduce the effective bias, so that the sensitivity of the system to true signals from the driver is not reduced below the levels required by the standards mentioned above.

The bias limitation may be achieved by sensing the signal current and adjusting the bias in accordance therewith. Alternatively, the bias limitation may be achieved by sensing the signal voltage and adjusting the bias current in dependence thereon. This voltage control may be supplemented by further voltage sensing means for detecting noise spikes and increasing the bias in the presence of severe noise. The bias current adjustment may be either gradual or switched.

Major features of the invention include the following:

a current regulating circuit including means for feeding a current to one signal line and means for drawing a matching current from the other signal line;

a resistor connected between the two signal lines to pass said current; and, for each signal line, current adjustment means responsive to the conditions on the signal lines for adjusting the current through the resistor.

The current regulating means may be controlled by current mirror circuitry.

The current regulating circuit may comprise means for producing a constant current and the current adjustment means may then comprise, for each signal line, means for diverting the current away from passage through the resistor. The means for diverting the current away from the resistor may optionally comprise further current mirror circuitry.

Alternatively, the current mirror circuitry controlling the current regulating circuit may include a switchable resistance controlled by logic circuitry forming the current adjustment means.

The present invention also provides a method of suppressing interference on signal lines in a system comprising a line driver and a receiver coupled by a pair of signal lines including the step of preprocessing signals arriving via the pair of signal lines at the receiver by regulating the potential between predetermined limits to modify the sensitivity of the system to compensate for changes in line conditions to reject interference when the line drive is powered down.

BRIEF DESCRIPTION OF THE DRAWINGS

Further features and characteristics of the invention will become apparent from the following detailed description of various embodiments thereof, given by way of example and with reference to the drawings, in which.

DESCRIPTION OF PREFERRED EMBODIMENT

Figure 1:
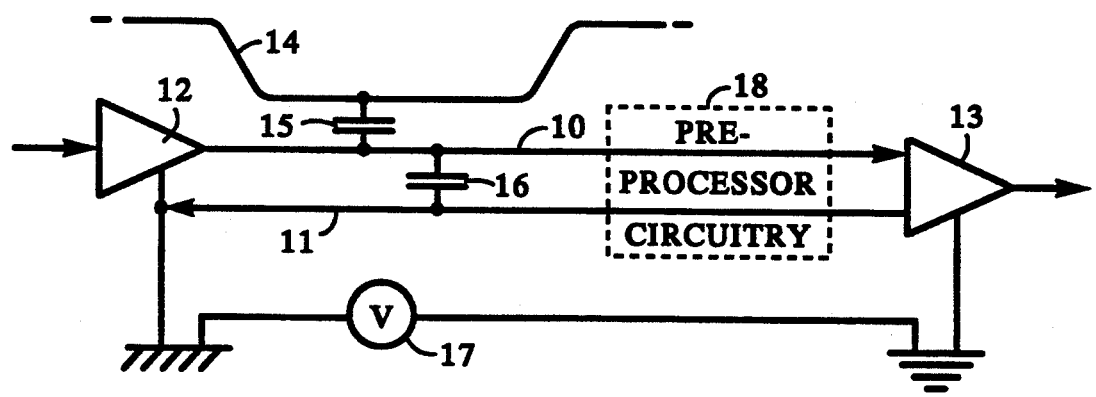
FIG. 1 is a diagram partially in block form, and partially in schematic form, of a driver and receiver.

FIG. 1 shows a typical signal line 10 and common or return line 11 connecting a driver 12 and a receiver 13. The receiver 13 is a balanced differential amplifier and trigger circuit, which is responsive to the voltage difference between the lines 10 and 11.

When the driver 12 is powered down, its output impedance to line 10 is high. If a signal line 14 of another channel runs alongside the signal line 10 for a substantial distance, there will be a substantial capacitive coupling 15 between the lines 10 and 14. Signals on line 14 will therefore be cross-coupled onto line 10. Line 10 is also coupled to ground via its capacitance to the return line 11, the (high) output resistance of the powered down driver 12, and the input resistance of the receiver 13. The amplitude of the cross-coupled interference will be thus determined by the resulting voltage division.

The input impedance of the receiver 13 presented to the signal line 10 is much smaller than the output resistance of the powered down driver 12. The voltage on line 10 is therefore substantially the ground voltage local to the receiver 13 (ignoring cross-coupled interference for the moment). The return line 11, however, is grounded at the driver 12, and its voltage is therefore that of the ground local to the driver 12 (the input impedance presented to the line 11 by the receiver 13 is high relative to the very low resistance to ground at the driver 12). It can easily happen that the local grounds at the driver 12 and receiver 13 differ by a few volts, V, as indicated by the voltage source 17. This will result in a substantial (and possibly varying) voltage appearing at the receiver 13 between the lines 10 and 11.

Both these sources of interference can therefore cause false triggering of the receiver 13.

In the present system, preprocessing circuitry 18, illustrated in phantom in FIG. 1, is connected to the lines 10 and 11 immediately in front of the receiver 13. The function of this preprocessing circuitry is to limit interference signals between the lines 10 and 11 to levels below that at which the receiver 13 will trigger, during periods when the driver 12 is powered down. (Of course, the circuitry 18 must not interfere with signals from a powered up driver.) The circuitry 18 is connected to the lines 10 and 11 but, as will be seen, these lines pass through the circuitry 18 to the receiver 13 substantially directly.

Figure 2:
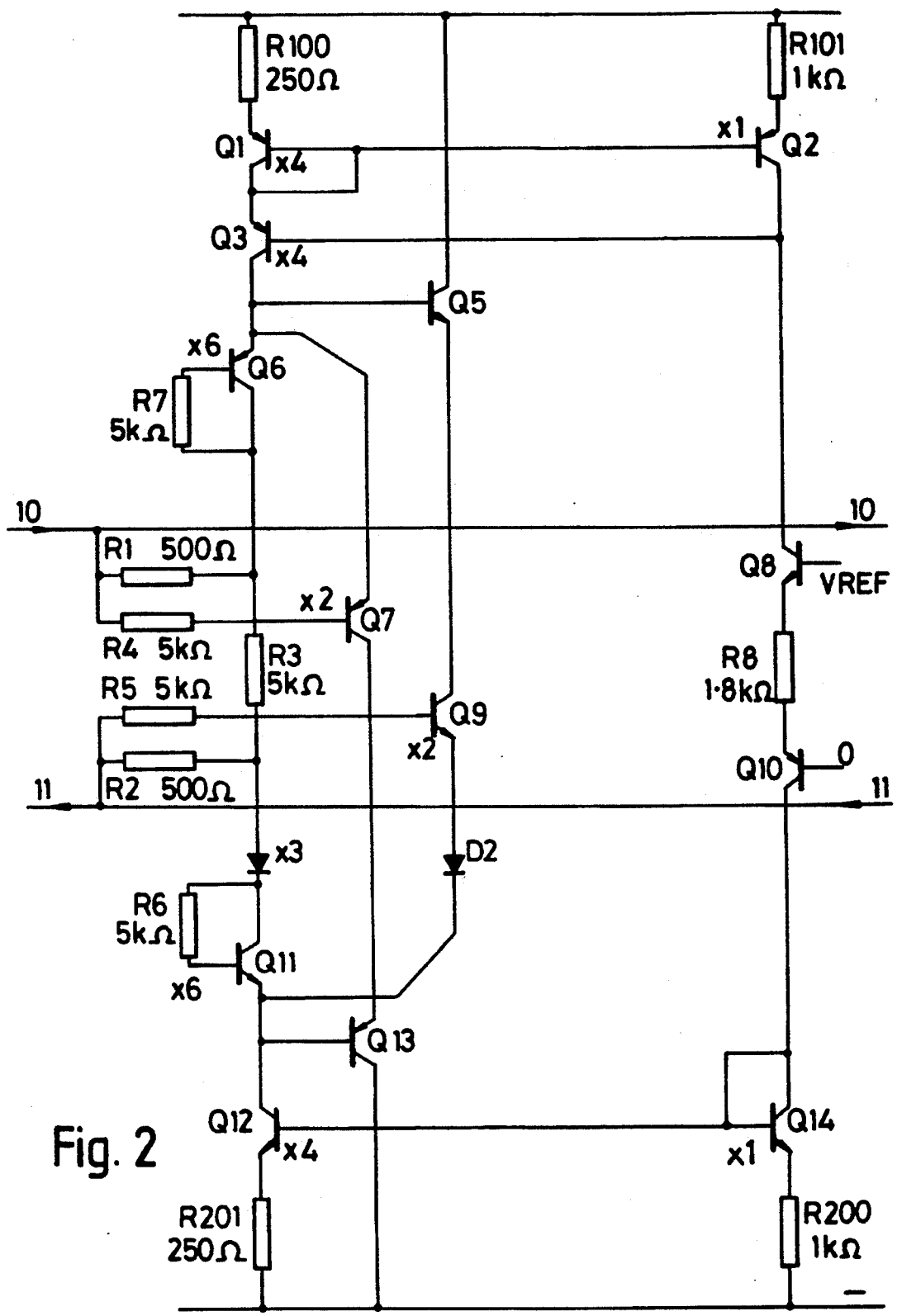
FIG. 2 is a schematic diagram of a current-controlled preprocessing circuit.

FIG. 2 is a circuit diagram of one embodiment of preprocessing circuitry. The lines 10 and 11 enter at the left-hand side, from the driver 12, and pass through to the right-hand side, continuing on to the receiver 13. The conditions on these lines are sensed, and the preprocessing circuitry adjusts these conditions to reduce interference signals to below the level at which they can cause triggering of the receiver 13. The circuit can be regarded as consisting of a current reference generating branch Q2-Q8-R8-Q10-Q14; regulating branch Q1-Q3-Q6-R3-Q11-Q12 which regulates the voltage between the lines 10 and 11; and two current diverting branches, Q5-Q9 and Q7-Q13. It will be seen that the circuit has, with relatively minor exceptions, a symmetry which interchanges the top and bottom; thus transistors Q1 and Q12, for example, are of opposite types (PNP and NPN) but are otherwise matched.

Considering first the current reference generating branch, reference voltages Vref and 0 are applied to the respective bases of NPN transistor Q8 and PNP transistor Q10 having their emitters connected together through a 1.8 kOhm resistor R8 as shown. This gives a constant reference current of 150 $\mu$A, which therefore also flows through the two further transistors Q2 and Q14 connected in series with Q8 and Q10.

The reference voltages Vref and 0 are preferably common to several lines (or channels), particularly if they are implemented on a single chip; this has the advantage that the current in all receivers can be adjusted (and will track each other) by trimming the single signal Vref.

The 150 $\mu$A current in the generating branch is mirrored into the regulating branch with amplification. PNP transistor Q1 and NPN transistor Q12 have 4 times the areas of Q2 and Q14, respectively. Accordingly the current in the reference current branch is mirrored into the regulating branch as a current of 600 mA. This current flows through the 5 kOhm resistor R3, so generating a voltage of 3 V across it. The lines 10 and 11 are connected to the two sides of R3 via a pair of 500 Ohm resistors R1 and R2, respectively, as shown.

Transistors Q1 and Q3 are in cascade connection, giving a higher input impedance looking into Q3. This improves the matching of Q3 and Q12, because the input impedance of NPN transistor Q12 is higher than that of PNP transistor Q3. (If the circuit was implemented by a bipolar technology in which NPN and PNP transistors were accurately matched, Q3 would not be necessary.) Resistors R100, R101, R200, and R201 increase the effective impedances of the current mirrors.

Since the current in the regulating branch is held steady, the voltage difference across R3 is held steady while the voltages at the ends of R3 can move up and down relatively freely. The voltage between lines 10 and 11 is therefore held steady at a value which holds the input of the receiver constant, thus avoiding any false triggering. (The input voltage at which the receiver output changes is normally close to 0 V). If the voltage on line 11 is changed by cross-coupled noise from an adjacent line, the voltage on line 10 is changed by substantially the same amount (line 10 having a high impedance at its driver end). The preprocessing circuitry acts as a negative impedance which slightly reduces the total impedance between line 10 and ground.

The operation as so far described is modified by the current diverting branches. The two transistors Q6 and Q7 control a current diversion from resistor R3 at the upper part of the regulating branch, and the two transistors Q9 and Q11 perform a similar function for its lower part. The sizes of transistors Q6 and Q11 in the regulating branch are 6 times the areas of Q2 and Q14, respectively, and the sizes of Q7 and Q9 are 2 times the areas of Q2 and Q14, respectively. Thus there is a 3:1 size ratio between Q6 and Q7, and between Q11 and Q9. With no voltage across resistor R4, the current from transistor Q1 will divide in the ratio 3:1 between transistors Q6 and Q7, so that the current through Q6 will in fact be 450 $\mu$A, giving a voltage of 2.25 V across R3.

When the driver 12 is powered on and applies a load to the line (lines 10 and 11), voltages will be developed across the two 500 $\Omega$ resistors R1 and R2. Considering the current diverting path Q7-Q13, the voltage on line 10 will be applied to the base of transistor Q7, while the voltage on the base of Q6 will differ from that on the base of Q7 by the voltage drop across R1. The load applied to line 10 increases the base voltage on Q7 relative to that on Q6, and so the division of the current from Q1 between Q6 and Q7 will be changed from its 3:1 ratio.

This current division is given approximately as follows. Taking Ie(Q6) and Ie(Q7) as the respective actual emitter currents of Q6 and Q7; and Is(Q6) and Is(Q7) as their respective reverse saturation currents, we have $$Ie(Q6)/Ie(Q6) = Is(Q7) = Is(Q7).exp(\Delta V/Vt) \qquad (1)$$

where $\Delta V$ is the voltage difference between the bases of Q6 and Q7 and Vt is a constant (kt/q, =26 mV at a temperature of 300° K.). In equation (1), the term Is(Q6)/Is(Q7) equals the area ratio of Q6 and Q7, which is a constant equal to 3. The voltage difference $\Delta V$ is approximately Iline$\times$R1, where Iline is the current flowing into the line 10 and R1=500 Ohm. (The base current from Q7 also makes a contribution to the line current, but this can be ignored as long as the gain of Q7 is high.)

The current division ratio is therefore 3:1 if line 10 is purely floating, giving a voltage on line 10 of about 2.25 V as discussed above. If a signal is applied to line 10 resulting in the voltage on line 10 rising, then the division ratio also rises, with the current through Q6 rising towards the full current through Q1. If, on the contrary, the voltage on line 10 falls, the division ratio also falls. The current through Q6 thus falls towards zero and the biasing effect of the circuit is reduced as the input signal (between lines 10 and 11) approaches the switching level of around 0 V.

The 5 kOhm resistors R4 and R7 operate to limit the reverse base-substrate currents (parasitic diode currents) which flow when the input voltage (on either or both of lines 10 and 11) is more negative than the negative supply rails. The precise form of protection required depends on the particular form of implementation of the circuit, and some implementations (e.g. those using dielectric isolation between transistors, or discrete circuit components) may not require any specific protection. The base currents flowing through R4 and R7 therefore affect the emitter-base voltages of Q6 and Q7. A more accurate equation for $\Delta V$ is therefore $$\Delta V = Ic(Q6).R1 + Ib(Q6).R7 - Ib(Q7).R1 \qquad (2)$$

Because of the "early voltage effect", particularly of the PNP transistors, an active load Q13 is provided at the collector of the current limit transistor Q7. This improves the voltage performance of the circuit by ensuring that the collector-emitter voltage of Q7 tracks that of Q6 to within about 3 V. This reduces the dependence of the current limit circuit on collector-emitter voltage differences due to input voltage changes, etc., and makes the circuit less sensitive to early voltage effects on Q7.

There is a corresponding adjustment of the current division between Q9 and Q11 in response to voltage changes on line 11, as a result of the symmetry mentioned above. Two diodes D1 and D2 are included to prevent reverse base-emitter voltage breakdown on Q9 and Q11 when the voltage on line 11 is more negative than the negative supply rail.

Figure 3A:
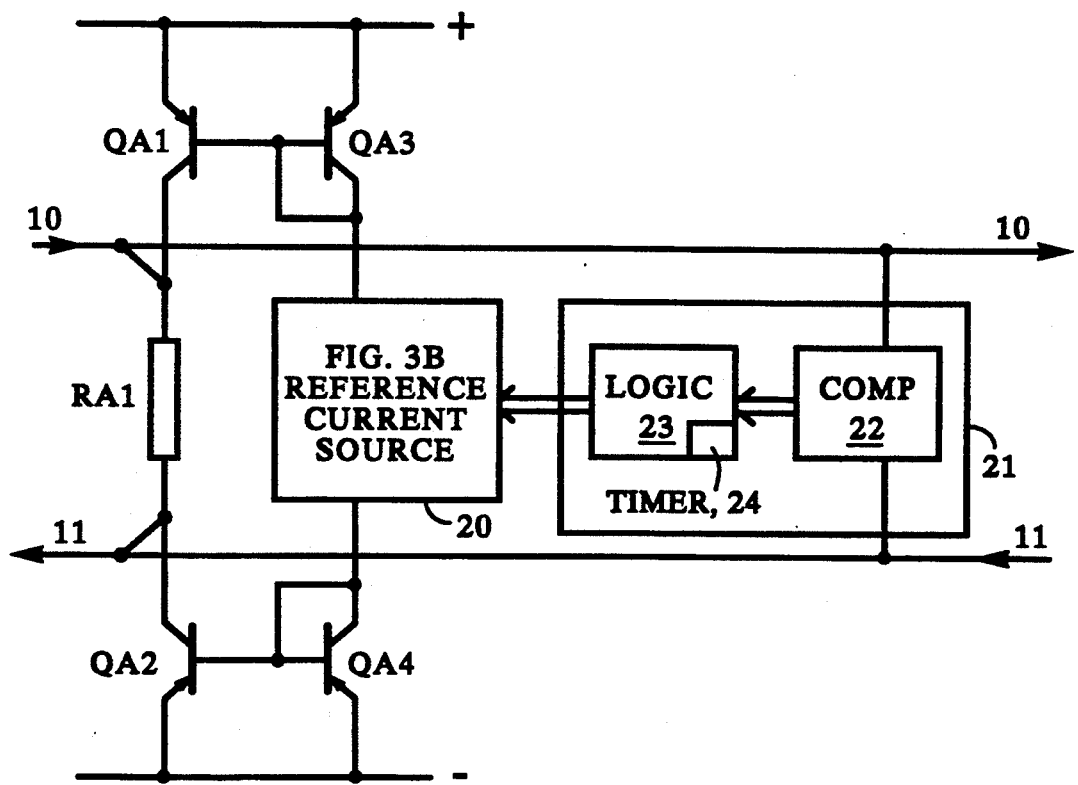
FIGS. 3A and 3B together are a diagram, partially in block form, and partially in schematic form, of a voltage-controlled preprocessing circuit.
Figure 3B:
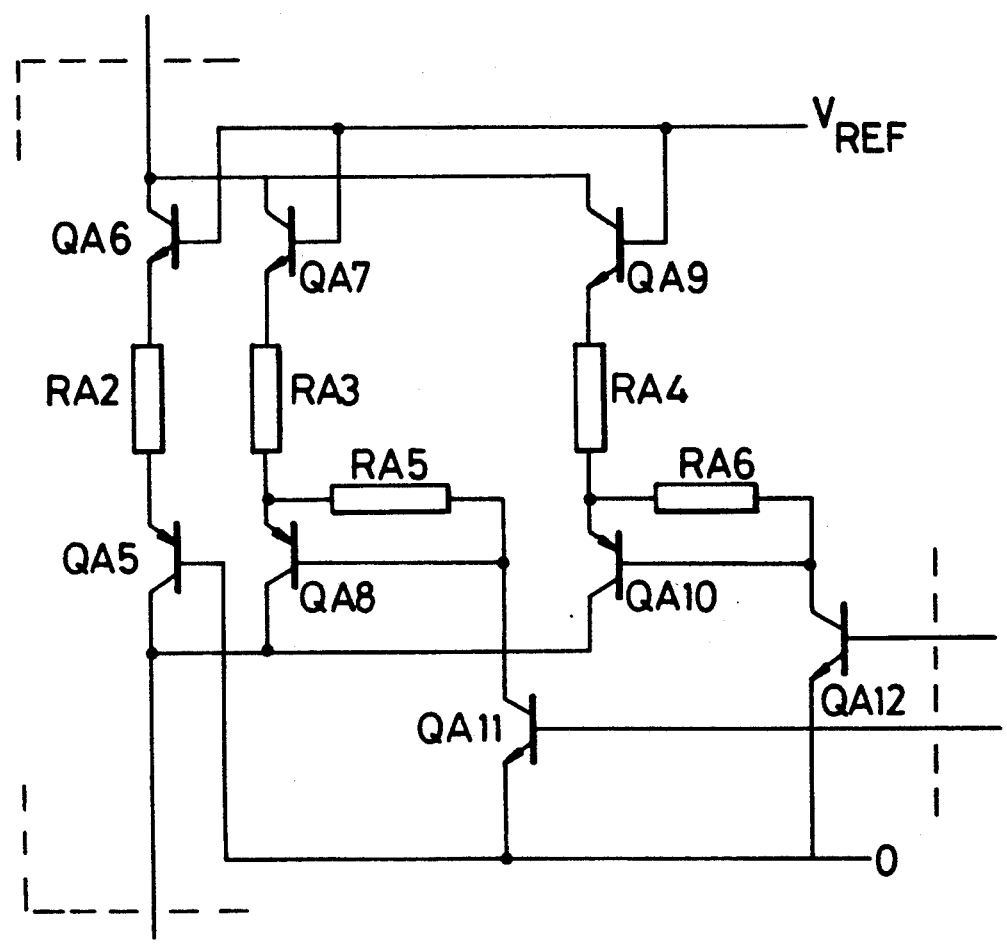

FIGS. 3A and 3B show a second form of preprocessing circuitry. The major difference from FIG. 2 is that instead of using current diverting branches, the current supplied by the current mirror is varied in dependence on the input signal voltage between lines 10 and 11. Further, this dependence is switched (rather than varying continuously as the currents in the current diverting branches in FIG. 2 do).

Referring first to FIG. 3A, this shows, a current regulating branch QA1-RA1-QA2 and a current reference branch QA3-block 20-QA4. In the current regulating branch, transistor QA1 corresponds to transistor Q1 of FIG. 2, resistor RA1 to resistor R3, and transistor QA2 to transistor Q12. In the current reference branch, transistor QA3 corresponds to transistor Q2, block 20 to the reference current source Q8-R8-Q10 and transistor QA4 to transistor Q14.

The reference current source is shown in FIG. 3B. In place of the single path Q8-R8-Q10 of FIG. 2, there are three parallel paths QA6-RA2-QA5, QA7-RA3-QA8, and QA9-RA4-QA10. Of these, the first is always on, but the second and third are switched, so that the reference current produced by block 20 is switched between three different values. (As will be explained, path QA7-RA3-QA8 is forced on if path QA9-RA4-QA10 is turned on). Path QA7-RA3-QA8 is turned on and off by switching QA8 on and off by means of a control transistor QA11, and path QA9-RA4-QA10 is similarly controlled by switching QA10 on and off by means of a control transistor QA12.

Referring again to FIG. 3A, the control signals to the block 20 are obtained in response to the input signal on lines 10 and 11 via a control block 21 consisting of a comparator block 22 feeding a logic block 23. Path QA7-RA3-QA8 is controlled in dependence on the voltage between lines 10 and 11 so that the current produced by block 20 is reduced when a signal appears between them; path QA9-RA4-QA10 is controlled in dependence on the detection of a high noise pulse level.

Considering first the path QA7-RA3-QA8, this is controlled by a current control comparator in block 22, which operates at a voltage about 200 mV and controls that current path directly. As long as the voltage between lines 10 and 11 is above this level, the path QA7-

RA3-QA8 is turned on. In the quiescent condition, with the driver 12 powered down, the FIG. 3B circuit operates with paths QA5-RA2-QA6 and QA7-RA3-QA8 both turned on (and path QA9-RA4-QA10 off) to bias the voltage between lines 10 and 11 to about 1.8 V. This condition remains as long as the noise between lines 10 and 11 remains low enough not to take the voltage below the 200 mV level.

If the signal between lines 10 and 11 takes the voltage below 200 mV, then the current control comparator output changes, and turns off the path QA7-RA3-QA9. This reduces the current bias, and so effectively increases the sensitivity of the receiver.

The current path QA9-RA4-QA10 is a noise control path controlled by two further comparators, a noise start comparator for detecting the start of noise and a noise end comparator for detecting its end, and controlling that current path through associated timer 24 and latching circuits in the logic block 23.

The noise start comparator operates at a level of 0 V. The associated timer 24 in the logic circuitry 23 detects whether the voltage remains below 0 V for a time of less than 5 ms. If this condition is satisfied, then it is assumed that the signal is noise rather than a data signal. (Noise spikes resulting from cross-coupling are generally short, because they result from capacitive coupling and the decay time is usually short.) This turns on the current path QA9-RA4-QA10. The increase of current from block 20 increases the bias voltage between the lines 10 and 11 to about 3.7 V.

The noise end comparator operates at a level of 3 V. When noise has been detected, the bias voltage between lines 10 and 11 is, as just explained, about 3.7 V. As long as substantial noise remains on the line, the bias voltage is maintained at this elevated level, but once it ends, the bias voltage is reduced to its normal level of 2 V. The noise end comparator detects excursions of the voltage between lines 10 and 11 to below 3 V (from the bias level of 3.7 V), and the associated timer 24 detects whether the voltage remains above the 3 V level for 200 ms. If this condition is satisfied, it is assumed that the high noise conditions have ended, and the latch which was set by the low noise comparator and timer is cleared, so turning off the path QA9-RA4-QA10.

The logic circuitry 23 also includes an interlock circuit which ensures that if the current path QA9-RA4-QA10 is turned on, the current path QA7-RA3-QA8 is turned on as well.

Figure 4:
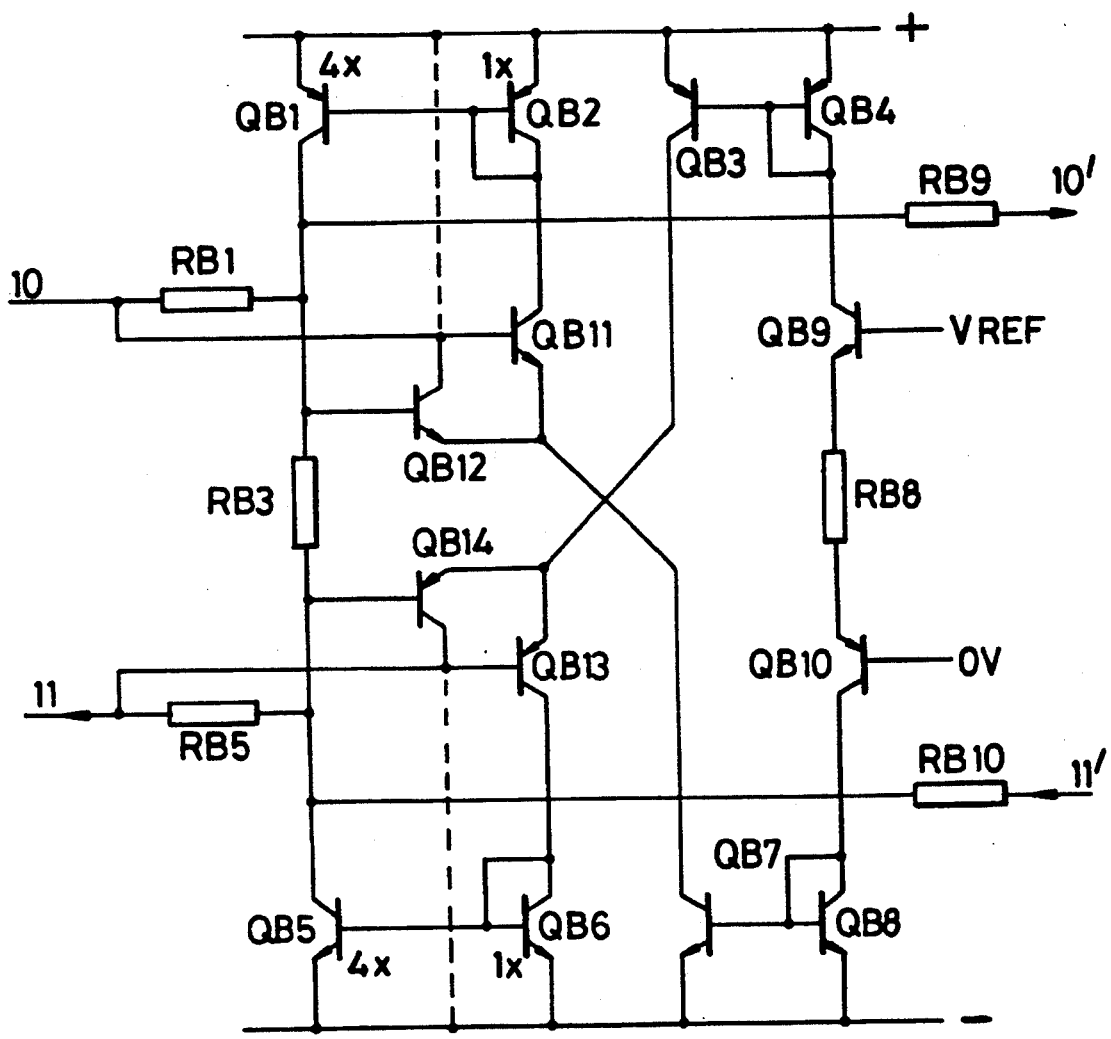
FIG. 4 is a schematic diagram of two further current-controlled pre-processing circuits.

FIG. 4 shows a third form of pre-processing circuitry. This operates on broadly the same principles as the circuit of FIG. 2, but of course with certain differences. Two slightly different versions are shown, one in which the collectors of QB12 and QB14 are connected to the supply rails (shown in phantom) and the other in which these collectors are connected to the lines 10 and 11 as shown.

As in the FIG. 2 circuit, transistors QB9 and QB10 and resistor RB8 set a reference current (200 μA). This current also flows through QB4, and is mirrored into QB3. The mirrored current of 200 μA therefore divides between QB13 and QB14. If there is no Current in RB5, then the base voltages of Q3 and QB14 are equal, and the 200 μA divides equally between these two transistors. The current through QB13 also flows through QB6, and is mirrored into QB5. The size of QB5 is chosen to be 4 times that of QB6, so the mirrored current in QB5 is 4 times the current in QB6.

Assume first that the collectors of QB12 and QB14 are connected to the supply rails (phantom). The current through QB14 then flows direct to the supply rail and plays no useful role. The current through QB13, however, also flows through QB6, and is thence mirrored into QB5. QB5 is designed to have 4 times the area of QB6, so the resulting current in QB5 is 400 μA. Correspondingly, 400 μA flows through QB1. These currents correspond to the currents in Q1-Q3 and Q11-Q12 of the FIG. 2 circuit.

If the voltage on line 11 varies, then current will flow in RB5. The base voltages of QB13 and QB14 will therefore differ, and the division of the 200 μA between these two transistors will therefore be changed. For example, if line 11 goes positive and a current flows into the circuit from that node, then the base of QB13 will be more positive than the base of QB14. QB13 will therefore take less current and QB14 will take more. This will cause the current in QB6, and hence that in QB5, to fall.

A change of voltage on line 10 on the other half of the circuit will have corresponding effects, taking into account that the symmetry between the two halves of the circuit involves a sign reversal.

This circuit suffers from the disadvantage that the gain (the change in the current through QB1 in response to a change of input voltage) is low. This can be alleviated by connecting the collectors of QB12 and QB14 to the lines 10 and 11 as shown, so that the current flowing through these transistors is fed to the input resistors RB1 and RB5 instead of being dumped to the supply rails.

The analysis of this version of the circuit is more difficult. However, it can be seen that when current flows in RB5, the current through QB13 falls and that through QB14 rises. The current in RB5, however, also flows through QB14, and thus increases further the current in QB13. This gives positive feedback, which increases the gain of the circuit, but has the drawback that there is a danger of latching.

What we claim is:

1. A system comprising:
   a pair of signal lines;
   a line driver connected to supply a voltage to said pair of signal lines when said driver is in a powered-up state;
   a receiver, coupled to said line driver by said pair of signal lines to become operative in response to said powered-up state of said line driver;
   regulating means, coupled to said pair of signal lines, for regulating a voltage difference between said signal lines within predetermined voltage limits and for preventing said receiver from becoming operative when said driver is in a powered down state.

2. The system of claim 1, wherein said regulating means further comprises:
   means, responsive to said voltage from said line driver for limiting said voltage difference to enable said receiver to become operative in response to said powered-up state of said line driver.

3. The system of claim 2, wherein said regulating means further comprises means responsive to said voltage from said line driver for effecting adjustment of said voltage to limit said voltage difference to enable said receiver to become operative in response to said powered-up state of said line driver.

4. The system of claim 2, wherein said regulating means further comprises:
   means, responsive to said voltage from said line driver in a powered-up state, for limiting said voltage difference to enable said receiver to become operative in response to said powered-up state of said line driver.

5. The system of claim 4, wherein said regulating means further comprises noise sensing means for detecting noise current spikes on said signal lines and increasing said voltage difference in the presence of noise current spikes above a predetermined level.

6. The system of claim 3, wherein said regulating means further comprises noise sensing means for detecting noise current spikes on said signal lines and for increasing said voltage difference in the presence of noise current spikes above a predetermined level.

7. The system of claim 6, wherein said means for detecting noise current spikes comprises a timer to indicate when said voltage difference exceeds a noise threshold for a predetermined time period.

8. The system of claim 7, wherein said noise threshold is 3 volts.

9. The system of claim 7, wherein said time period is 200 ms.

10. The system of claim 1, wherein the voltage difference is continuously variable in response to said voltage from said line driver.

11. The system of claim 1, wherein the voltage difference is variable over a plurality of discrete voltage levels responsive to said voltage from said line driver.

12. The system of claim 11, wherein said regulating means comprises:
   a resistor connected between said pair of signal lines;
   a current regulating circuit comprising:
   means for feeding a current through said resistor to provide a voltage; and
   a pair of current adjustment means, each one of said pair of current adjustment means coupled to a corresponding line of said pair of signal lines, for adjusting said current passing through the corresponding end of said resistor in response to said voltage from said line driver.

13. The system of claim 12, wherein the current regulating circuit further comprises means, coupled to said pair of signal lines for providing said voltage difference between said pair of signal lines.

14. The system of claim 12, wherein the current regulating circuit is controlled by a current mirror circuit.

15. The system of claim 14, wherein the current regulating circuit further comprises means, coupled to said pair of signal lines for providing said voltage difference between said pair of signal lines.

16. The system of claim 14, wherein said current regulating circuit further comprises means, coupled to said pair of current adjustment means, for diverting the current away from passage through the resistor.

17. The system of claim 16, wherein the means for diverting the current away from passage through the resistor comprises a second current mirror circuit coupled to said pair of current adjustment means.

18. The system of claim 17, wherein said means for diverting further comprises a logic circuit responsive to said voltage from said line driver disposed to control a switchable resistance in said second current mirror circuit.

19. A method for suppressing interference on signal lines in a system including a line driver coupled to a receiver by a pair of signal lines comprising the steps of:
   supplying a voltage difference between said pair of signal lines when said driver is powered down, said voltage difference effective to preclude said receiver from becoming operative in response to said interference on said signal lines when said driver is powered down;
   detecting noise current spikes on said pair of signal lines when said driver is powered down and increasing said voltage difference in the presence of said noise current spikes that are above a predetermined level; and
   limiting said voltage difference to said pair of signal lines when said driver is powered-up, to enable said powered-up driver to operate said receiver.

20. A signal transmission system including interference suppression circuitry, comprising:
   a line driver having an output connected to a receiver input by a pair of signal lines susceptible to induced signals, said line driver switchable between a powered-up condition to supply an operating signal to said receiver over said pair of signal lines, and a powered down condition; and
   bias regulating circuitry means, connected to said signal lines to respond to said operating signal for adjusting a voltage difference between said signal lines and for enabling operation of said receiver by said operating signal when said driver is in said powered-up condition, and for precluding said receiver from operation due to said induced signals when said driver is in said powered down condition.

21. The system according to claim 20 wherein said bias regulating circuitry means is connected to each of said pair of signal lines to feed current through a resistor coupling said signal lines to maintain a predetermined voltage difference across said signal lines when said driver is in a powered down condition, and to reduce said current in response to said operating signal.

22. The system according to claim 21 wherein said bias regulating circuitry means comprises a current regulating branch having two portions, wherein each portion is coupled to a corresponding signal line, each portion further comprising:
   a current source circuit coupled to a voltage reference including:
   a first branch connected to a respective end of said resistor and to said voltage reference to maintain a constant current flow through said resistor independent of induced signals on said signal lines when said driver is in a powered down condition, and
   a second branch coupled to said first branch and said respective signal line to divert said current flow from said resistor by diverting said constant current provided by said voltage reference away from said first branch when said driver is in a powered-up condition.

* * * * *